(No Model.)
J. S. DUNHAM.
SCRUBBER.
No. 562,072. Patented June 16, 1896.
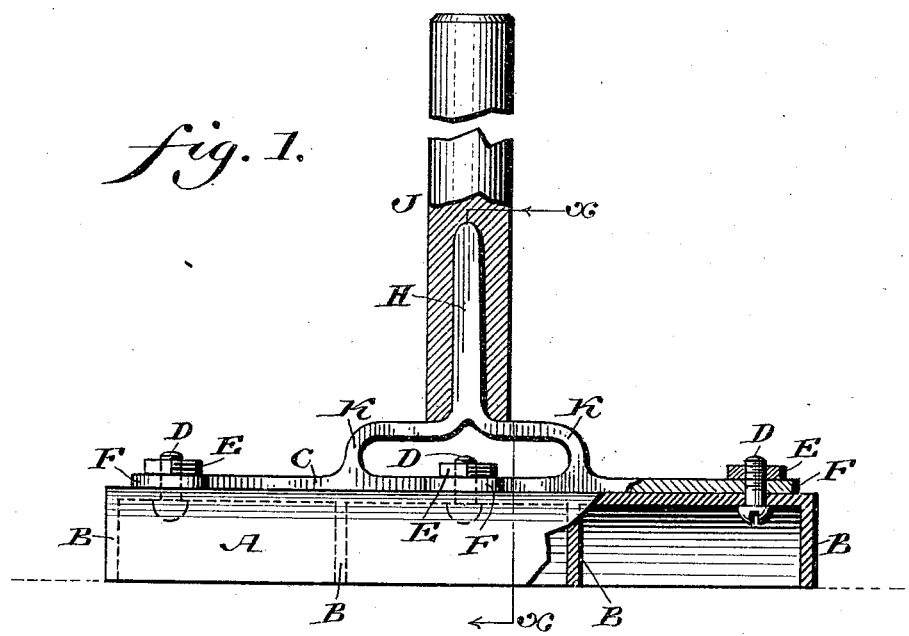
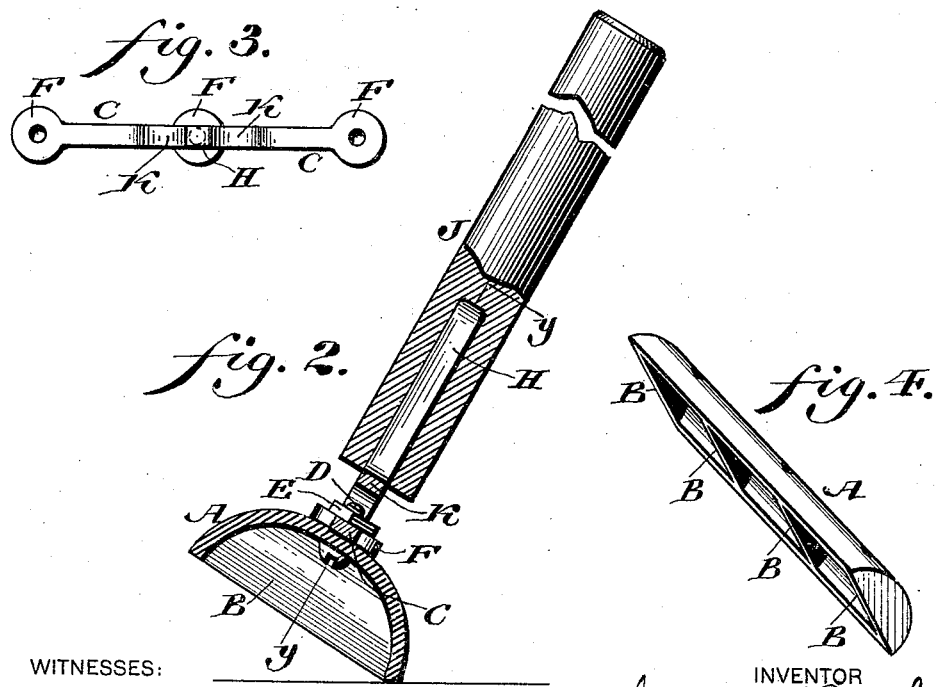
WITNESSES:
L. Douville,
P. F. Nagle.
INVENTOR
Joseph S. Dunham
BY John A. Wiedersheim
ATTORNEY.

UNITED STATES PATENT OFFICE.

JOSEPH S. DUNHAM, OF CAMDEN, NEW JERSEY.

SCRUBBER.

SPECIFICATION forming part of Letters Patent No. 562,072, dated June 16, 1896.

Application filed October 22, 1895. Serial No. 566,491. (No model.)

*To all whom it may concern:*

Be it known that I, JOSEPH S. DUNHAM, a citizen of the United States, residing in the city and county of Camden, State of New Jersey, have invented a new and useful Improvement in Scrubbers, which improvement is fully set forth in the following specification and accompanying drawings.

My invention consists of a scrubber for floors, pavements, sidewalks, &c., the same being composed of a channeled or guttered head, preferably of cylindrical form, the edges of which may be brought in contact with the place to be scrubbed, the said head being provided with means for bracing or strengthening the same.

It also consists of novel means for connecting the head with a handle, the same insuring a strong connection of said parts and permitting access to the fastening nuts or devices of the same.

Figure 1 represents a partial side elevation and partial irregular vertical section on line $y\ y$, Fig. 2, of a scrubber embodying my invention. Fig. 2 represents an irregular vertical section thereof on line $x\ x$, Fig. 1. Fig. 3 represents a top or plan view of a detached portion thereof, on a reduced scale. Fig. 4 represents a perspective view of the head of the scrubber detached, on a reduced scale.

Similar letters of reference indicate corresponding parts in the several figures.

Referring to the drawings, A designates a rubber or elastic head, which is of semicylindrical form, and B designates semicylindrical braces or pieces which are connected with the interior thereof and extend transversely to the longitudinal direction of the head, thus strengthening said head and preventing spreading of the wall of the head at the bottom thereof.

C designates a longitudinally-extending bar which is placed on the outer face of the crown of the head A and secured thereto by screws D and nuts E, the screws passing through said head and eyes F on said bar.

H designates a tang which extends from the central portion of the bar C, and is adapted to be connected with the handle J of the device.

In order to strengthen the connection of the tang with the bar C, I employ the bridge K, which is formed with the bar and tang, and set out from said bar and provides a wide intermediate part between said bar and tang, and also provides a space which admits of access to the nut and screw at the center of the bar.

It will be seen that either edge of the head A may be presented to the floor or place to be scrubbed, and the water will be pushed to and fro or backward and forward by said edge, the friction of the latter on the floor, &c., causing the softening and removal of the dirt in an effective manner, after which the floor, &c., may be rubbed by said edge and made bright and comparatively dry.

Should the head be worn or fractured, the nuts and screws are removed and the head and bar separated, after which a new head is applied, the screws are placed in position, and the nuts fitted on the screws and tightened, the central screw and nut being readily manipulated owing to the opening formed by the bridge K.

While I have shown the head cylindrical in form, it may be made three sided or other shape, so long as it preserves a guttered or channeled form, the back of which is braced and strengthened by the arm or bar C, which is constructed of metal or other suitable material.

Having thus described my invention, what I claim as new, and desire to secure by Letters Patent, is—

1. A channeled head of elastic material, and transverse braces within the same, connected with the inner wall thereof, substantially as described.

2. A channeled head of elastic material, transverse braces therein, connected with the inner wall thereof, and a longitudinally-extending bar on the crown of said head, and means for securing said bar to said crown, substantially as described.

3. A channeled head of elastic material, transverse braces therein, secured to the inner wall thereof, a longitudinally-extending bar on the crown of said head, bolts and nuts for securing said bar to said crown, and a bridge on said bar set out from the central portion of the same, over the securing-bolt and nut thereat, said parts being combined substantially as described.

JOSEPH S. DUNHAM.

Witnesses:
JOHN A. WIEDERSHEIM,
R. H. GRAESER.